Inventors,
C. König & K. Schwämmle
By: Glascock Downing & Seebold
Attys.

Patented Feb. 11, 1941

2,231,583

UNITED STATES PATENT OFFICE 2,231,583

CONTROL VALVE ARRANGEMENT FOR HYDRAULICALLY MOVED STRUCTURAL PARTS OF AIRCRAFT

Carl König, Stuttgart, and Karl Schwämmle, Stuttgart-Zuffenhausen, Germany

Application September 13, 1938, Serial No. 229,792
In Germany September 17, 1937

1 Claim. (Cl. 121—38)

This invention relates to a valve control arrangement with automatic return of longitudinally movable control members for hydraulic installations for moving structural parts of aeroplanes, for instance retractable undercarriages and tail skid springings, and for moving landing flaps, coolers and other parts by means of longitudinally variable struts, piston valves being operated for initiating the motion.

Such arrangements in aircraft, which are operated from the pilot's cockpit and, after the termination of the operative motion, are put out of action automatically by pressure, are known. More particularly in the case of liquid pressure arrangements, the pressure medium of which is conveyed by an always simultaneously moving source of power, such as worms or toothed wheel pumps, an automatic return to idle running is desirable. With each retractable strut are associated two control bodies with several control positions; consequently in the vicinity of the pilot's seat there are for all structural parts actuated by the installation a plurality of such control members. These members have to be operated with the necessary attention; an expenditure of force being required in manipulations which will occupy the pilot to an undesirable extent.

The known rotary or piston valves require numerous auxiliary devices and appliances which often cause disturbances and give rise to accidents. Further drawbacks are met in the case of piston valves which are not hydraulically balanced and in which large axial forces act upon the piston guides and put heavy stresses on the bearing and stuffing boxes and require much power to overcome friction.

The object of the invention is to make the whole arrangement substantially lighter, simpler, and more easily controlled by all the devices necessary for satisfactory operation being enclosed within the arrangement. A further object of the invention is to save space by arranging a number of control pistons of the same shape in a single casing for actuating a number of movable elements.

In the accompanying drawing the construction and system of connections of the control arrangement according to the invention is illustrated by way of example.

Figure 1:
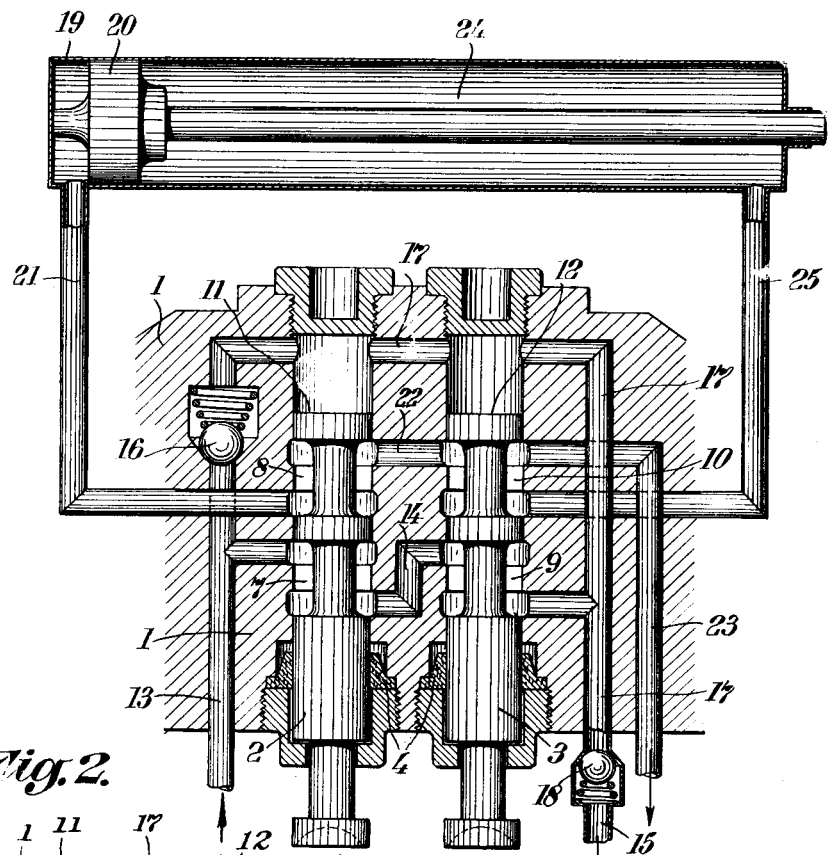
Fig. 1 is a sectional view partly in elevation illustrating the control valves in a neutral position.

The control arrangement consists substantially of the casing 1 and the piston valves 2 and 3, which lie parallel to one another and are longitudinally movable in the same. These valves extend out of the casing, are made fluid-tight with respect to the casing by packings 4 and are provided at their ends with press buttons 5 and 6. The parts of the piston valves 2 and 3 which are surrounded by the casing are provided with control conduits 7 and 8 and 9 and 10 respectively. The end surfaces of the pistons bear the reference numerals 11 and 12 respectively. The pressure oil coming through the supply pipe 13 from the pump passes in the initial position shown through the control conduit 7, the connecting conduit 14 and the control conduit 9 into the return flow conduit 17 and through the throttle 18 into the outflow pipe 15 which leads to the reservoir. In addition, the supply pipe 13 is in communication by way of an excess pressure valve 16 with the same return flow conduit 17 and the outflow pipe 15; this return flow conduit 17 is also in communication with the spaces above the end surfaces 11 and 12 of the pistons. In front of the outflow pipe 15 which forms a continuation of the return flow conduit 17 a throttling valve 18 is provided.

The left-hand working space 19 of the cylinder of the retractable strut is in communication, when the piston valve is in the position shown, by way of the pipe 21 with the control passage 8, this passage by way of the connecting conduit 22 with the control passage 10 and the latter with the outflow conduit 23 to the reservoir. Similarly, the right-hand working space 24 of the cylinder of the retractable strut is in communication by way of the pipe 25 and the control passage 10 with the same outflow conduit 23. In other words, the piston spaces of the cylinder of the retractable strut are on either side completely pressureless and the retractable strut is held in its position by locking means of a known kind.

Figure 2:
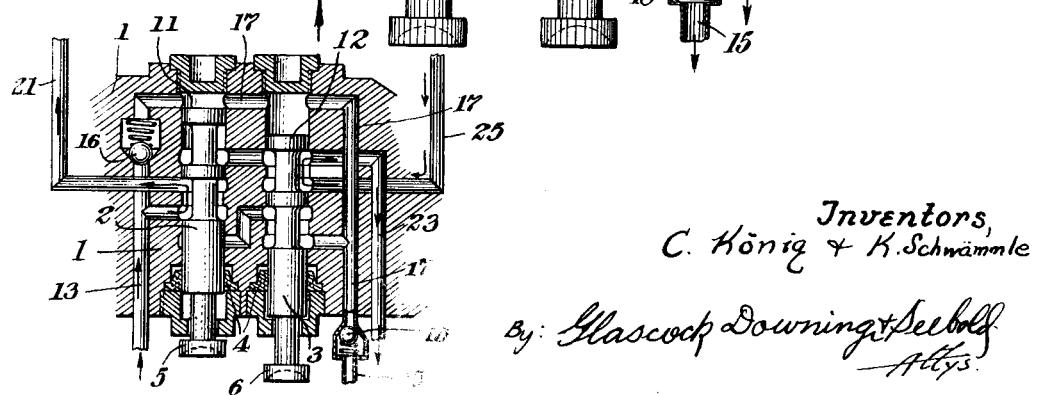
Fig. 2 is a similar view showing the position of one of the valves for moving a part of the aircraft in one direction.

When, for letting down the undercarriage, the left-hand press button 5 is pressed towards the casing 1 as shown in Fig. 2 and the piston valve 2 is displaced and the control passage 7 will connect the pump supply pipe 13 with the pipe 21 which leads to the space 19 of the strut cylinder. The piston 20 will be displaced to the right (the undercarriage being thereby let down) and the oil which has up to then been in the space 24 of the strut cylinder will flow by way of the pipe 25 and the control passage 10 into the outflow pipe 23. When the piston 20 has reached the end of its stroke, there will be a rise in pressure from the space 19 of the strut cylinder to the pump supply pipe 13, which will open the excess pressure valve 16 and allow the pressure oil to flow by way of the return flow conduit 17 and the throttle 18 into the outflow pipe 15. The back pressure caused by the pipe resistance and the throttling acts on the piston end surface 11, causing the piston valve 2 to be forced back into its initial position. The piston valve cannot stick in an intermediate position, more particularly on the return flow conduit opening and the excess pressure valve closing, as in every position the idle running pressure in the return flow conduit 17 acts on the piston end surfaces 11 and 12 respectively, the valve conduits being hydraulically relieved. In the retracted position the free flow from the pump delivery pipe 13 to the outflow pipe 15 is re-established, the excess pressure valve 16 having closed and the pump having been changed over to idle running through the uncovering of the connecting passage.

The corresponding sequence of operations takes place, on the right-hand press button 6 being actuated, the pressure oil passing into the right-hand space 24 of the strut cylinder. In this case the piston 20 will be moved to the left and by this means the undercarriage is retracted. At the end of the stroke the idle running pressure will again be established in the return flow conduit 17, which will cause the piston valve to move back again, so that the idle running state is again established, as soon as the piston valve is again in the initial position.

What we claim is:

A valve control arrangement for a hydraulic motor in which each control valve is automatically returned to its original position after each operation, comprising a casing, two longitudinally slidable piston control valves mounted in the casing, each having an end surface, and two portions of reduced diameter in its sliding surface, a liquid inlet passage and a return flow passage, the former having two branches, one leading, by way of the reduced portions of the control valves, to one or other side of the piston of the hydraulic motor or to the return flow passage, according to the positions of the control valves, and the second leading to the spaces above the end surfaces of the control valves, an excess pressure valve in the second branch, so that after a control valve has been actuated, when the hydraulic motor piston reaches its end position, the liquid pressure opens the valve and allows liquid access to the end surfaces of the control valves, for returning the valve which was actuated to its initial position.

CARL KÖNIG.
KARL SCHWÄMMLE.